No. 768,318. PATENTED AUG. 23, 1904.
E. G. THOMAS.
RAIL BOND.
APPLICATION FILED MAR. 19, 1903.
NO MODEL.
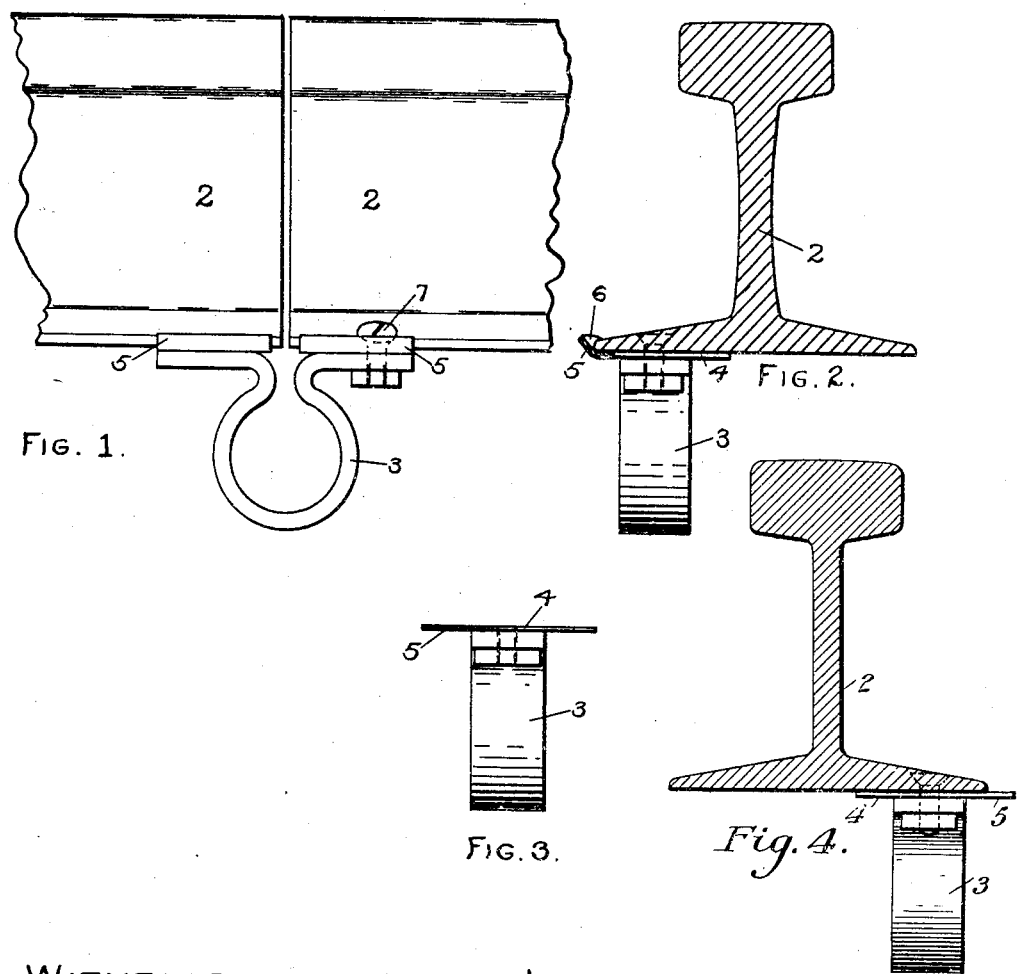
WITNESSES
Howard Forbes
Chas. J. Fogg
INVENTOR
Edward G. Thomas No. 768,318. Patented August 23, 1904.

UNITED STATES PATENT OFFICE.

EDWARD G. THOMAS, OF WALTHAM, MASSACHUSETTS.

RAIL-BOND.

SPECIFICATION forming part of Letters Patent No. 768,318, dated August 23, 1904.

Application filed March 19, 1903. Serial No. 148,525. (No model.)

*To all whom it may concern:*

Be it known that I, EDWARD G. THOMAS, a citizen of the United States, and a resident of Waltham, in the county of Middlesex and State of Massachusetts, have invented certain new and useful Improvements in Rail-Bonds, of which the following is a specification.

My invention relates to the art of electrically connecting the rails of electric railways by means of flexible conductors or rail-bonds, and has to do more particularly with that class of rail-bonding constructions in which the bonds are soldered to the bottom of rails.

In soldering rail-bonds to the bottom surfaces of a pair of rails it has been customary first to tin the surfaces of those portions of the rails to which the bond is to be applied, then to clamp the bond to the rails, then to heat the rails and bond, and, finally, to apply the flux and solder. The parts are then allowed to cool, and the clamps are removed. This process has proved in practice to be difficult and expensive, owing to the horizontal position and almost inaccessible location of the surfaces to be soldered together and to the tendency of the melted solder to fall away from the parts to which it is applied or to run back along the unmelted bar of solder instead of adhering at the point of application. This process has also involved a considerable waste of solder on account of the tendency of the melted solder to flow over or around the exterior of the parts to be soldered rather than in between the same. Owing to these difficulties it has become customary to join a number of rails together and tip them bottom side up and then to bond them while in this position, the section of rails thus bonded being then turned upright and set in place on the ties. Even with this method of procedure, however, the section of rails thus bonded must still be connected to the adjacent sections, so that the difficulties above pointed out can be only partially overcome in this manner.

My invention is intended to provide an improved rail-bond which may be readily secured to the bottom surface of the rails after the latter have been set in place on the ties, and to this end I provide a rail-bond having a flexible portion of any desired construction and having at its points of attachment supplementary conducting-strips forming or providing the attaching surfaces to be soldered to the rails, said strips being extended laterally beyond the edges of the bond proper, on one side thereof, and being made flexible for a purpose hereinafter described.

To secure my bond to the rails after the latter have been set in place on the ties, I clamp the bond to the bottom surfaces of the rails with the attaching strips above referred to in capillary relationship with said surfaces and extending a short distance beyond the edge of the rail-flanges, thus forming at each point of attachment a projecting horizontal ledge. I then heat the parts to be joined and apply the flux and a quantity of melted solder to the ledges above referred to, which ledges retain the solder until the latter flows or is drawn by capillary attraction in between the meeting surfaces of the attaching-strips and rail, whereupon the parts are allowed to cool, and the clamps are then removed. By preference before applying the flux and solder I bend each of the flexible projecting ledges slightly upward and also bend its ends inward against the edge of the rail, thus forming a sort of cup-shaped receptacle which prevents the solder from escaping or flowing in any other direction than in between the adjacent surfaces of the attaching-strips and rail.

My bond and the method of attaching the same are illustrated in the accompanying drawings, in which—

Figure 1 is a side elevation of the adjacent ends of a pair of rails with my bond secured to the bottoms thereof. Fig. 2 is a transverse vertical section through one of the rails, showing the bond in end elevation. Fig. 3 is an end view of the bond itself before it is applied to the rails. Fig. 4 is a view similar to Fig. 2, showing a slight modification.

In the drawings, 2 2 represent the adjacent ends of a pair of rails, and 3 represents a bond having a flexible portion of any desired construction and provided at its points of attachment with inelastic conducting-strips 4 4, usually made of copper, each of which projects laterally beyond the edge of the bond proper and is made thin enough to be readily flexible at this projecting portion. This bond is applied to the rails, as indicated in Fig. 2, with the flexible edges 5 5 of the strips 4 4 projecting sufficiently beyond the rail-flanges to form solder-retaining ledges. The clamps employed are not shown, their construction being well known. In Fig. 2 these ledges are shown as bent upward and also bent inward at their ends to fit the edges of the rail-flanges, thus forming receptacles 6, into which the flux and solder are run during the process of attachment, as above described. I have found, however, that even if the edges of the strips 4 4 are not bent upward, but are left flat, as shown in Fig. 4, the flat ledges thus provided will still retain melted solder in sufficient quantity to provide for the ready application of the bond.

The strips 4 are preferably made to project beyond both edges of the bond proper, as shown in Fig. 3, in order that it may be immaterial which edge of the bond is adjacent to the edges of the rail-flanges and also in order to insure an ample attaching and conducting area between the bond and the rails.

In addition to the solder as a means of attachment it is usual in some cases to employ bolts or rivets passing through the rail-flanges and the ends of the bond. Such a bolt is shown at 7 and is applied in a well-known manner.

The herein-described method of attaching my bond to the rails is not claimed in this application, being claimed in a divisional application filed by me on the 29th day of July, 1903, Serial No. 167,393.

My construction and method renders it unnecessary to tin the attaching-surfaces of the rails, as has been the common practice heretofore; but the strips 4 4 of my bond are preferably tinned on their attaching-surfaces when the bond is made.

I claim as my invention—

1. A rail-bond comprising a flexible portion provided with attaching-strips extending laterally beyond one side of the bond proper, and having flat top faces which extend to the edges of said strips, said extended portions of the strips being flexible and inelastic, substantially as described.

2. A rail-bond comprising a flexible portion provided with attaching-strips extending laterally beyond one side of the bond proper and having flat top faces which extend to the edges of said strips, the extended portions of said strips being capable of being bent to form a receptacle in connection with the edges of the rail-flanges, substantially as described.

In testimony whereof I have hereunto subscribed my name this 13th day of March, 1903.

EDWARD G. THOMAS.

Witnesses:
  E. D. CHADWICK,
  JOSEPH T. BRENNAN.